United States Patent
Onoe et al.

(10) Patent No.: US 9,863,765 B2
(45) Date of Patent: Jan. 9, 2018

(54) TOOL LENGTH MEASUREMENT APPARATUS

(71) Applicant: DMG Mori Seiki Co., Ltd., Yamatokoriyama-shi (JP)

(72) Inventors: Ken Onoe, Isehara (JP); Akira Kimura, Isehara (JP)

(73) Assignee: DMG Mori Seiki Co., Ltd., Nara (JP)

( * ) Notice: Subject to any disclaimer, the term of this patent is extended or adjusted under 35 U.S.C. 154(b) by 143 days.

(21) Appl. No.: 15/044,364

(22) Filed: Feb. 16, 2016

(65) Prior Publication Data

US 2016/0238366 A1   Aug. 18, 2016

(30) Foreign Application Priority Data

Feb. 17, 2015 (JP) .................................. 2015-028938

(51) Int. Cl.
  *G01B 21/02* (2006.01)
  *B23Q 17/00* (2006.01)

(52) U.S. Cl.
  CPC ............ *G01B 21/02* (2013.01); *B23Q 17/00* (2013.01)

(58) Field of Classification Search
  CPC .............................. G01B 21/02; B23Q 17/00
  USPC ................... 33/501, 700, 832, 833
  See application file for complete search history.

(56) References Cited

U.S. PATENT DOCUMENTS

| | | | | | |
|---|---|---|---|---|---|
| 2,876,553 | A | * | 3/1959 | Tomkow | G01B 13/00 137/15.24 |
| 2,995,825 | A | * | 8/1961 | Harping | G01B 13/00 33/530 |
| 5,473,822 | A | * | 12/1995 | Struble | G01B 3/008 33/556 |
| 6,843,125 | B2 | * | 1/2005 | Peterson | G01M 13/00 33/543 |
| 6,845,566 | B1 | * | 1/2005 | Clements | G01B 3/50 33/501.08 |
| 2002/0078586 | A1 | * | 6/2002 | Hatley | G01B 7/12 33/833 |
| 2009/0288490 | A1 | * | 11/2009 | Maruyama | B23Q 35/04 73/633 |
| 2011/0099827 | A1 | * | 5/2011 | Egger | G01B 13/12 33/701 |
| 2011/0258868 | A1 | * | 10/2011 | Jordil | G01B 5/012 33/503 |
| 2017/0136592 | A1 | * | 5/2017 | Ikai | B23Q 11/0046 |

FOREIGN PATENT DOCUMENTS

JP     2008-183699     8/2008

* cited by examiner

*Primary Examiner* — G. Bradley Bennett
(74) *Attorney, Agent, or Firm* — Fish & Richardson P.C.

(57) ABSTRACT

This invention reliably returns a measurement surface to a reference position while weakening the elastic force of a spring. A tool length measurement apparatus of this invention includes a supporter that supports the measurement surface that the tip of a tool contacts while translating in accordance with a biasing force received from the tool. The tool length measurement apparatus of this invention also includes a detector that detects the position of the measurement surface in a translation direction. The tool length measurement apparatus of this invention also includes a biasing unit that biases the measurement surface by a gas in a direction against the biasing force received from the tool.

6 Claims, 8 Drawing Sheets

TOOL LENGTH MEASUREMENT APPARATUS

BACKGROUND OF THE INVENTION

Field of the Invention

The present invention relates to a tool length measurement apparatus.

Description of the Related Art

In the above technical field, patent literature 1 discloses a technique of biasing a measurement surface upward by a spring.

[Patent Literature 1] Japanese Patent Laid-Open No. 2008-183699

SUMMARY OF THE INVENTION

In the technique described in the above literature, however, the elastic force of the spring is set strong assuming a situation in which the measurement surface cannot return to the reference position because of fixing of a coolant. For this reason, when a long small-diameter tool is pressed against the measurement surface, the tool breaks.

The present invention enables to provide a technique of solving the above-described problem.

One aspect of the present invention provides a tool length measurement apparatus comprising a supporter that supports a measurement surface that a tip of a tool contacts while translating in accordance with a biasing force received from the tool;

a detector that detects a position of the measurement surface in a translation direction; and a biasing unit that biases the measurement surface by a gas in a direction against the biasing force received from the tool.

According to the present invention, it is possible to reliably return the measurement surface to the reference position while weakening the elastic force of the spring to prevent breakage of a tool.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

A tool length measurement apparatus 100 according to the first embodiment of the present invention will be described with reference to FIG. 1. The tool length measurement apparatus 100 is an apparatus for detecting the cutter length, cutter diameter, breakage, and the like of a machine tool.

Figure 1:
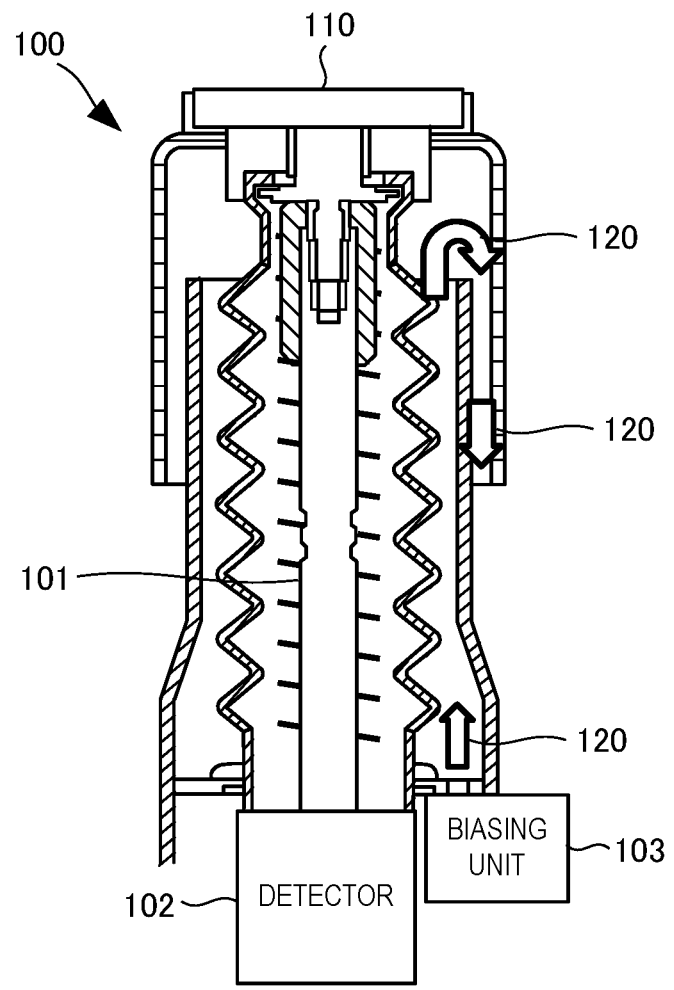
FIG. 1 is a sectional view showing the arrangement of a tool length measurement apparatus according to the first embodiment of the present invention.

As shown in FIG. 1, the tool length measurement apparatus 100 includes a supporter 101, a detector 102, and a biasing unit 103. The supporter 101 supports a measurement surface 110 that the tip of a tool contacts while translating in accordance with a biasing force received from the tool. The detector 102 detects the position of the measurement surface 110 in the translation direction. The biasing unit 103 biases the measurement surface 110 by a gas 120 in a direction against the biasing force received from the tool.

According to this embodiment, it is possible to reliably return the measurement surface to the reference position while weakening the elastic force of the spring.

Second Embodiment

Figure 2:
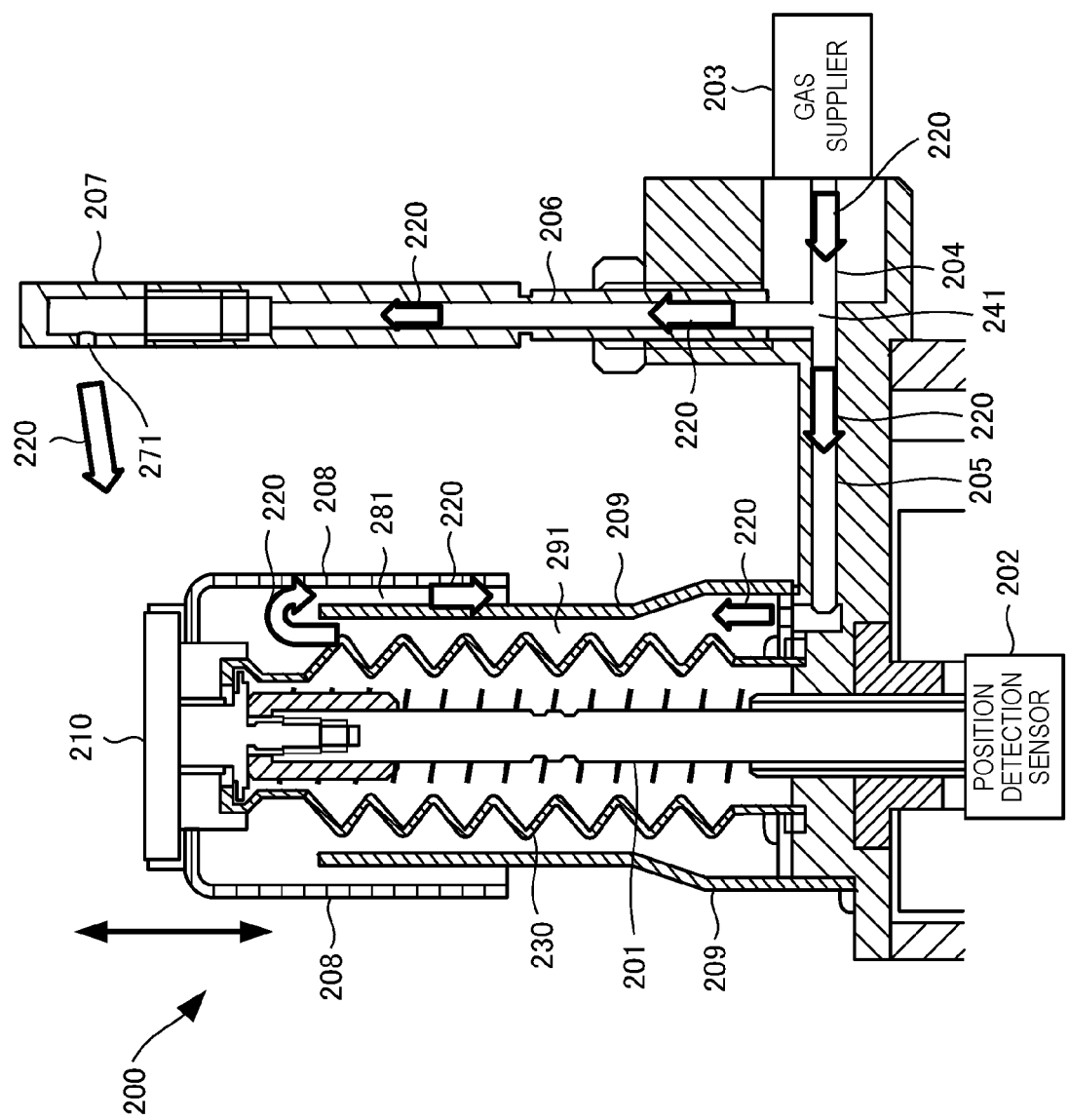
FIG. 2 is a sectional view showing the arrangement of a tool length measurement apparatus according to the second embodiment of the present invention.

A tool length measurement apparatus according to the second embodiment of the present invention will be described next with reference to FIGS. 2 to 4. FIG. 2 is a sectional view for explaining the arrangement of the tool length measurement apparatus according to this embodiment.

A tool length measurement apparatus 200 includes a supporter 201, a position detection sensor 202, a gas supplier 203, supply channels 204, 205, and 206, a blower 207, and foreign body entrance prevention covers 208 and 209.

The supporter 201 serving as a spindle is connected to the opposite side of a measurement surface 210. The supporter 201 may detachably be connected. When a cutter or the like attached to the tip of a tool comes into contact with the measurement surface 210, and the measurement surface 210 is pushed downward, the supporter 201 is also pushed downward interlockingly with the motion of the measurement surface 210.

The measurement surface 210 is made of a material that is not shaved by a cutting tool such as a drill, an end mill, or a pinion cutter. An example is a hard metal such as tungsten carbide or titanium carbide.

The supporter 201 translates in the vertical direction as the tool tip of a cutting tool or the like comes into contact with the measurement surface 210 and thus applies a biasing force (pressure), or the tool tip separates from the measurement surface 210 and removes the applied pressure.

That is, when the cutting tool approaches from above the measurement surface 210, the tip of the cutting tool comes into contact with the measurement surface 210, and the measurement surface 210 is pushed downward, the supporter 201 pushes back the measurement surface 210 in the direction against the push direction of the measurement surface 210, that is, upward.

The supporter 201 can be a member capable of moving in the direction opposite to the applied force in accordance with the force applied from the tip of the cutting tool to the measurement surface 210. For example, an elastic member such as a compression coil spring, or a hydraulic cylinder or a pneumatic cylinder is usable. In addition, if the spring has a strong elastic force, a thin cutting tool breaks. Hence, the spring need only have an elastic force that causes a vertical motion even by a small force.

If the elastic force (restoring force) of the spring is weak, the measurement surface 210 pushed by the cutting tool may be unable to return the original position because of fixing of a coolant. Accordingly, a correct tool length cannot be measured. In addition, the size of the cutting tool changes as its tip is shaved in use. Hence, correct working cannot be done unless the tool length is periodically measured. However, if the elastic force of the spring is weak, the measurement surface 210 may be unable to return to the reference position because of fixing of the coolant, and it may be impossible to measure a correct tool length.

To prevent this, the restoring force (elastic force) of the spring is compensated for by air 220. This makes it possible to reliably return the measurement surface 210 to the reference position against the fixing of the coolant even in a case in which a spring with a weak elastic force is used. It is therefore possible to measure a correct tool length. In addition, since the spring with a weak elastic force is used, it is possible to prevent even, for example, a thin tool tip from breaking, curving, or bending.

A bellows 230 configured to prevent foreign bodies from entering the supporter 201, the position detection sensor 202, and the tool length measurement apparatus 200 is attached around the supporter 201. When the bellows 230 is provided, chips or shavings of a metal or a water soluble coolant cannot contact or erode the interior of the supporter 201 or the tool length measurement apparatus 200. The member is not limited to the bellows 230, and any member capable of preventing foreign bodies from entering the tool length measurement apparatus 200 or the like is usable. The bellows 230 stretches/contracts according to the motion of the supporter 201.

Note that an example in which the supporter 201 supports the measurement surface 210 in the vertical direction has been described above. However, the direction in which the supporter 201 supports the measurement surface 210 is not limited to this, and any direction can be set as long as the supporter 201 can make a translational motion. For example, the support direction may be the horizontal direction or an oblique direction.

The position detection sensor 202 detects the position, for example, the Z-axis position of the measurement surface 210. The position detection sensor 202 and the supporter 201 are connected to each other. Any sensor capable of detecting the position of the measurement surface 210 is usable as the position detection sensor 202. For example, a contact sensor, a non-contact sensor, a magnetic sensor, an electric sensor, an optical sensor, and the like are usable, and the sensors are not limited to these.

The gas supplier 203 is a device capable of supplying a gas such as the air 220. The gas supplier 203 is connected to the supply channel 204 and supplies the air 220 to the supply channel 204. The gas to be supplied is not limited to the air 220. For example, oxygen, nitrogen, carbon dioxide, and the like are usable.

The air 220 supplied from the gas supplier 203 to the supply channel 204 is divided to the supply channels 205 and 206 at a branch point 241 and flows through the supply channels 205 and 206. The pressure and the supply amount of the air 220 supplied from the gas supplier 203 to the supply channels 204, 205, and 206 are not particularly limited as long as they can return the measurement surface 210 to the reference position (origin position) or a predetermined position. However, the pressure and the supply amount may appropriately be set by the user in accordance with the application purpose of the tool.

Additionally, as for the magnitude relationship between the air pressure and the spring pressure, the air pressure may be larger, the spring pressure may be larger, or the air pressure may equal the spring pressure. The pressures may appropriately be set by the user in accordance with the characteristics of the tool whose tool length is to be measured. The air pressure may be raised, and the spring pressure may be made as low as possible.

As for the supply timing of the air 220, the air 220 may automatically be supplied when the measurement surface 210 has lowered below the reference position. Alternatively, the air 220 may automatically be supplied when the measurement surface 210 has reached the lowermost point. The user of the tool length measurement apparatus 200 may manually supply the air 220. The supply timings of the air 220 are not limited to these, and the air 220 may be supplied at various timings.

The air 220 supplied from the gas supplier 203 flows through the supply channel 204 is divided into the air 220 flowing through the supply channel 205 and the air 220 flowing through the supply channel 206 at the branch point 241 of the supply channel 204. The air 220 that has branched to two systems at the branch point 241 flows through the supply channels 205 and 206.

The air 220 supplied from the gas supplier 203 and passed through the supply channel 205 rises through a gap 291 formed between the bellows 230 and the foreign body entrance prevention cover 209 and pushes the measurement surface 210 upward together with the elastic force of the supporter 201.

The traveling direction of the air 220 that has pushed the measurement surface 210 upward is reversed, and the air 220 passes through a gap 281 formed between the foreign body entrance prevention cover 208 and the foreign body entrance prevention cover 209 and is discharged to the outside of the tool length measurement apparatus 200.

The air 220 supplied from the supply channel 205 rises through the gap 291 and pushes the measurement surface 210 upward. The air 220 that has pushed the measurement surface 210 upward can only escape to the gap 281 and is therefore discharged from the gap 281 to the outside.

In addition, when passing through the gaps 281 and 291, the air 220 removes foreign bodies such as the coolant and chips in the gaps 281 and 291. This prevents the foreign bodies such as the coolant and chips from entering the tool length measurement apparatus 200 when the bellows 230 has torn. In addition, the vertical motion of the supporter 201 is not impeded.

Note that an example in which the air 220 is supplied to the gap 291 formed between the bellows 230 and the foreign body entrance prevention cover 209 has been described here. However, the air 220 may be supplied to the inside of the bellows 230 to push the measurement surface 210 upward.

The air 220 discharged from the gap 281 to the outside can prevent entrance of foreign bodies such as the coolant and chips from the machine to which the tool length measurement apparatus 200 is attached. Even if the foreign bodies such as chips have entered from the gap 281, they can be removed by the air 220 discharged from the gap 281.

The blower 207 includes an air outlet 271. The air 220 passed through the supply channel 206 and blown from the air outlet 271 blows off and removes the foreign bodies such as the coolant, chips, and shavings on the measurement surface 210.

The blow timing of the air 220 from the blower 207 is not particularly limited. For example, when measuring the tool length, the air may be blown when the tool has moved to the tool length measurement apparatus 200 by a predetermined distance and approached the measurement surface 210. In this case, since the air 220 is supplied to the supply channel 206 as well, it is possible to push the measurement surface 210 upward while blowing off the foreign bodies on the measurement surface 210. The air 220 from the blower 207 may continuously be blown during the operation of the tool length measurement apparatus 200 or may be blown at a timing at which the measurement surface 210 has reached the reference position. Note that when measuring the tool length, the measurement surface 210 can reliably be returned to the reference position by continuously supplying the air 220 from the gas supplier 203 for a predetermined time, and blowing from the blower 207 can be done in this state. It is therefore possible to efficiently blow off the foreign bodies on the measurement surface 210.

The air outlet 271 is not limited to the single air outlet, and may include a plurality of air outlets. The direction of the air outlet 271 can be an arbitrary direction as long as the air 220 can be blown to the measurement surface 210.

Figure 3:
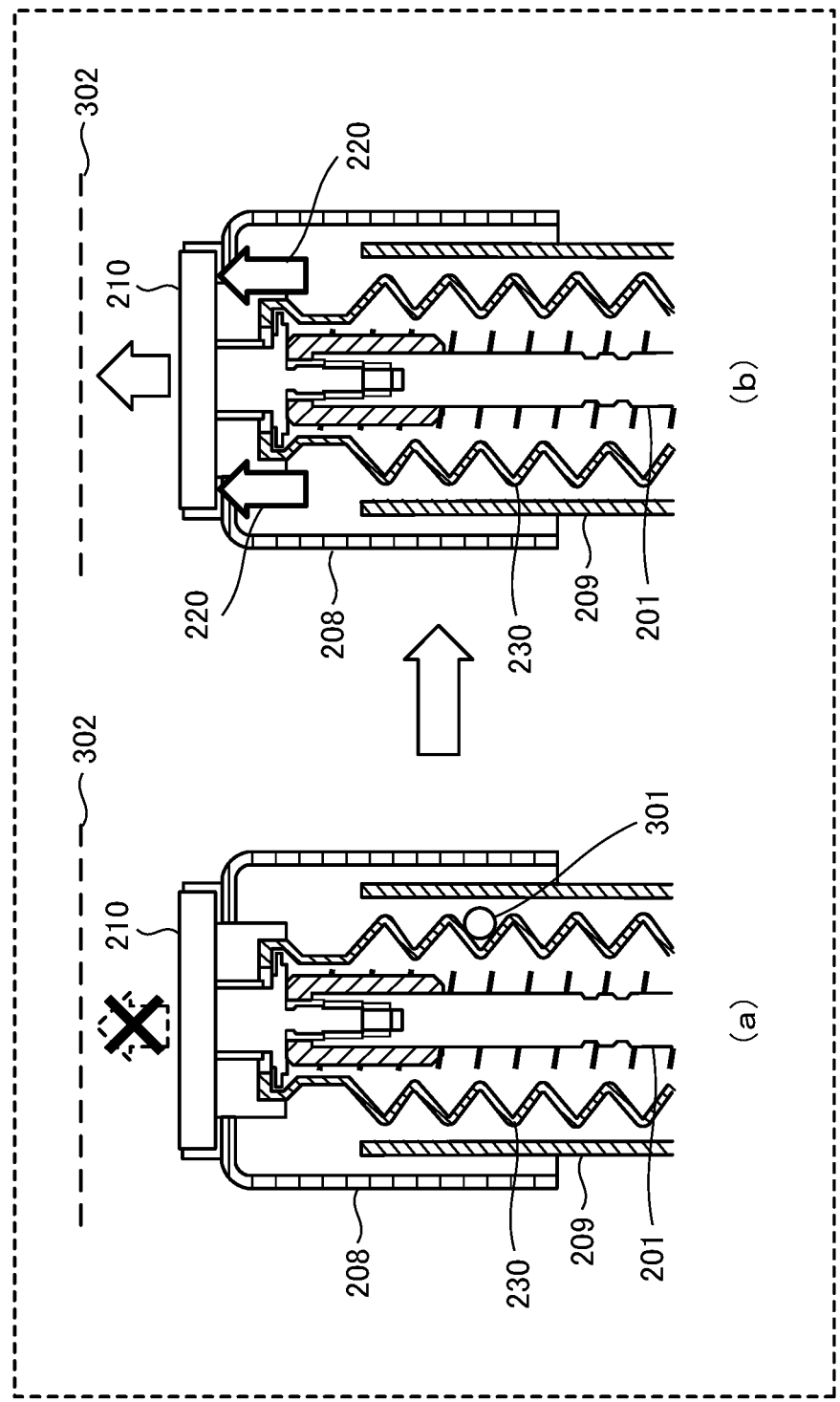
FIG. 3 is an enlarged sectional view of a measurement surface portion of the tool length measurement apparatus according to the second embodiment of the present invention.

FIG. 3 is an enlarged sectional view of a portion near the measurement surface 210 of the tool length measurement apparatus. When a coolant 301 fixes or sticks to the bellows 230, as shown in (a) of FIG. 3, the motion of the supporter 201 or the measurement surface 210 is impeded. For this reason, it is difficult to make the measurement surface 210 reach a reference position 302 only by the elastic force of the supporter 201 such as a spring. Hence, as shown in (b) of FIG. 3, the air 220 is supplied from the gas supplier 203 to compensate for the pushing force of the elastic force of the supporter 201 such as a spring, thereby pushing the measurement surface 210 upward.

Figure 4:
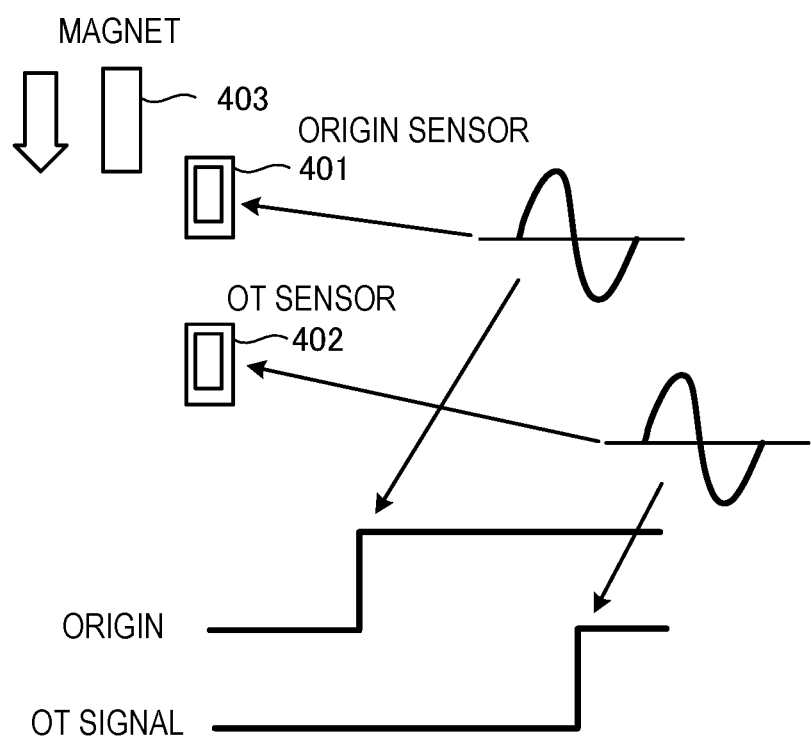
FIG. 4 is a sectional view showing the arrangement of the tool length measurement apparatus according to the second embodiment of the present invention.

FIG. 4 is a view for explaining position detection by the position detection sensor 202. Even when the measurement surface 210 is pushed upward by the air 220, it is unknown whether the measurement surface 210 has reached the reference position. Hence, the position of the measurement surface 210 is detected and determined using a signal from the position detection sensor 202 for position detection.

The position detection sensor 202 for position detection is preferably a non-contact sensor. However, the present invention is not limited to this, and a contact sensor may be used. The position detection sensor 202 may be a magnetic sensor, an optical sensor, an electric sensor, or the like.

The tool length measurement apparatus 200 need only detect the position of one point. The position of one point can be detected by, for example, detecting only contact/non-contact between metals. For example, when metals are in contact, an OFF state is attained. When the metals are separated and set in a non-contact state, an ON state is attained. In this case, a current is continuously supplied to the metals to detect contact/non-contact between the metals. Hence, the contact and non-contact of the metals are repeated, and an arc is generated. Since this operation is performed continuously, the metal contacts peel off, and the metals are oxidized to generate soot and the like. Since the soot and the like are sandwiched between the metals, the repetitive position detection accuracy becomes unstable.

Hence, in this embodiment, a noncontact sensor is used as the position detection sensor 202. As the noncontact sensor, a magnetic sensor that detects a magnetic flux or an optical sensor that uses an LED (Light Emitting Diode) or the like and a glass scale is usable.

The position detection sensor 202 includes an origin sensor 401, an overtravel sensor 402, and a magnet 403. The origin sensor 401 and the overtravel sensor 402 are magnetic resistance (MR) sensors. However, the present invention is not limited to these, and any sensor capable of detecting the passage of the magnet 403 is usable.

The position of the measurement surface 210 can be detected only by one sensor. In this embodiment, however, the overtravel sensor 402 is provided to prevent over stroke of the measurement surface 210. Hence, in this embodiment, the position of the measurement surface 210 is detected by the two sensors.

The magnet 403 moves interlockingly with the motion of the supporter 201 (measurement surface 210). The position of the magnet 403 is detected based on the signals from the origin sensor 401 and the overtravel sensor 402, thereby detecting the position of the measurement surface 210.

When the magnet 403 passes the origin sensor 401 and the overtravel sensor 402, the outputs of the sensors 401 and 402 form sine curves. For example, when the zero crossing points of the origin sensor 401 and the overtravel sensor 402 are compared, rectangular waves as shown in FIG. 4 are obtained.

By analyzing the signals of the two sensors, the position of the measurement surface 210 can be measured. That is, when the origin signal is low, and the overtravel signal (OT signal) is low, it is known that the magnet 403 has not yet passed the origin sensor 401. When the origin signal is high, and the overtravel signal is low, it is known that the magnet 403 has passed the origin sensor 401 but not yet the overtravel sensor 402. When the origin signal and the overtravel signal are high, it is known that the magnet 403 has passed the overtravel sensor 402. In addition, for example, a notifier such as an LED may be provided to display each state and notify the user of it.

The measurement surface 210 is preferably returned to the top by the pressure of the air 220. However, the measurement surface 210 need only pass at least the origin (reference position). In this case, if it is confirmed that the signals of the origin sensor 401 and the overtravel sensor 402 are low, it can be confirmed that the measurement surface 210 has passed the original position and returned to the normal position (reference position).

According to this embodiment, in a case in which a spring with a weak elastic force is used, even when fixing of the coolant has occurred, the measurement surface can be returned to the original position by air.

In addition, the motion of the measurement surface can be made moderate by weakening the elastic force of the spring. For this reason, even for a thin cutting tool, breakage and the like can be prevented, and chipping of the cutting edge or the like never occurs. Furthermore, since a gas is blown from the blower, foreign bodies on the measurement surface can be removed. Note that when it is confirmed that the measurement surface has returned to the reference position, and after that, blowing of the air 220 from the blower 207 is performed only for a predetermined time, the air 220 can reliably be blown to the measurement surface 210. It is therefore possible to efficiently blow off the foreign bodies on the measurement surface 210.

Third Embodiment

Figure 5:
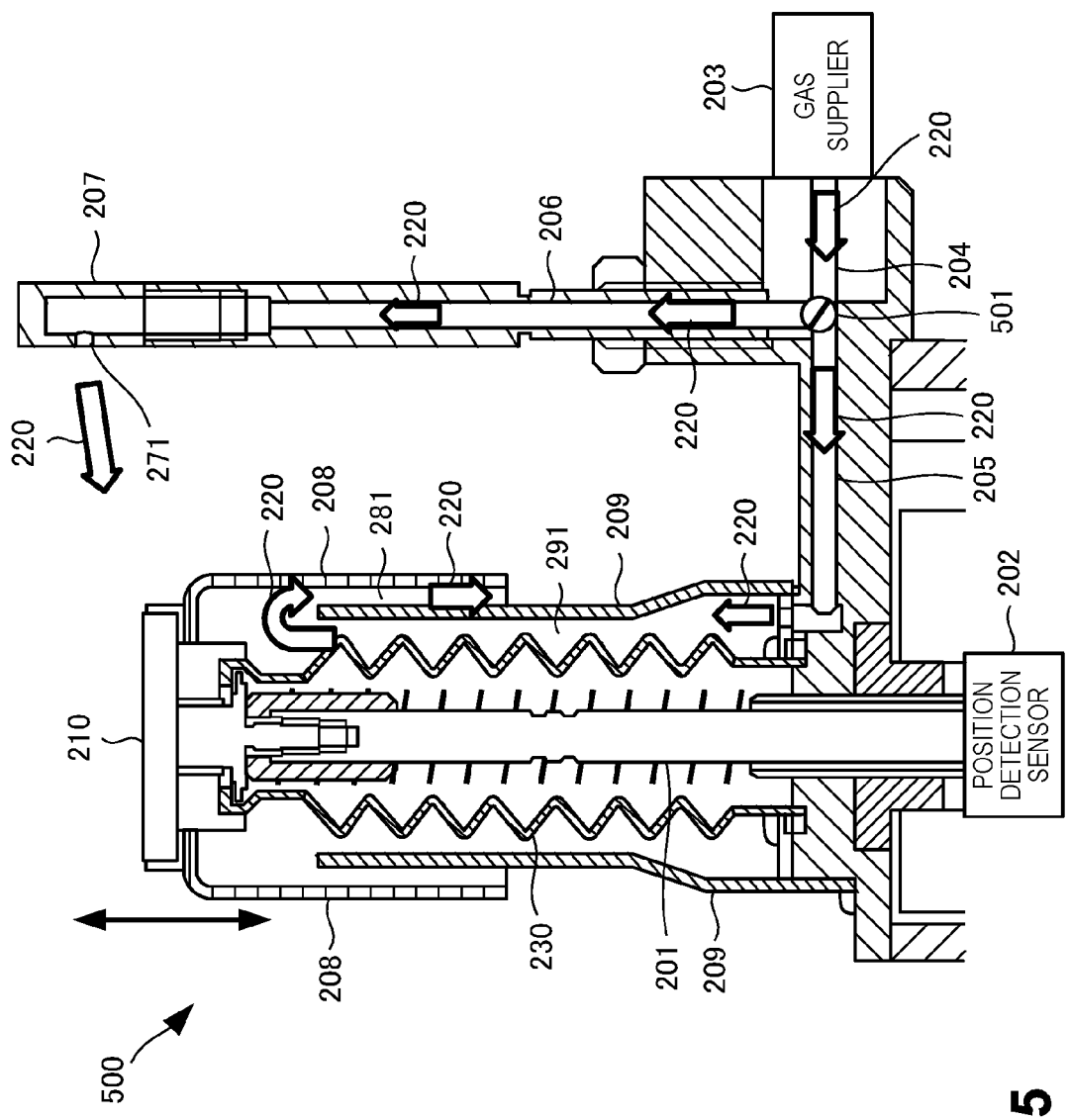
FIG. 5 is a sectional view showing the arrangement of a tool length measurement apparatus according to the third embodiment of the present invention.

A tool length measurement apparatus according to the third embodiment of the present invention will be described next with reference to FIG. 5. FIG. 5 is a sectional view for explaining the arrangement of the tool length measurement apparatus according to this embodiment. The tool length measurement apparatus according to this embodiment is different from the second embodiment in that a valve is provided in the gas supply channel. The rest of the components and operations is the same as in the second embodiment. Hence, the same reference numerals denote the same components and operations, and a detailed description thereof will be omitted.

A tool length measurement apparatus 500 includes a valve 501. The valve 501 need only switch between supply channels 205 and 206 as the supply destinations of air 220 passing through a supply channel 204 and may be, for example, a solenoid valve or a manual valve.

Until a measurement surface 210 completely returns to the reference position, the valve 501 is switched to intensively supply the air 220 to the side of the measurement surface 210, that is, the supply channel 205, thereby concentrating the pressure of the air 220 to the side of the measurement surface 210. When the valve 501 is switched to supply the air 220 to the side of a blower 207, that is, the supply channel 206 at a timing at which the measurement surface 210 has reached the reference position, chips, shavings, and coolant deposited on the measurement surface 210 can be removed.

Note that the timing to switch the valve 501 is not limited to the above-described timing, and may appropriately be selected in accordance with the application purpose of the tool length measurement apparatus 500. By appropriately switching the valve 501, the pressure and the supply amount and timing of the air 220 to be supplied to the supply channels 205 and 206 can be controlled.

According to this embodiment, since a valve is provided, the air supply channel can be switched as needed. In addition, the pressure and the supply amount of the air 220 can be controlled.

Fourth Embodiment

Figure 6:
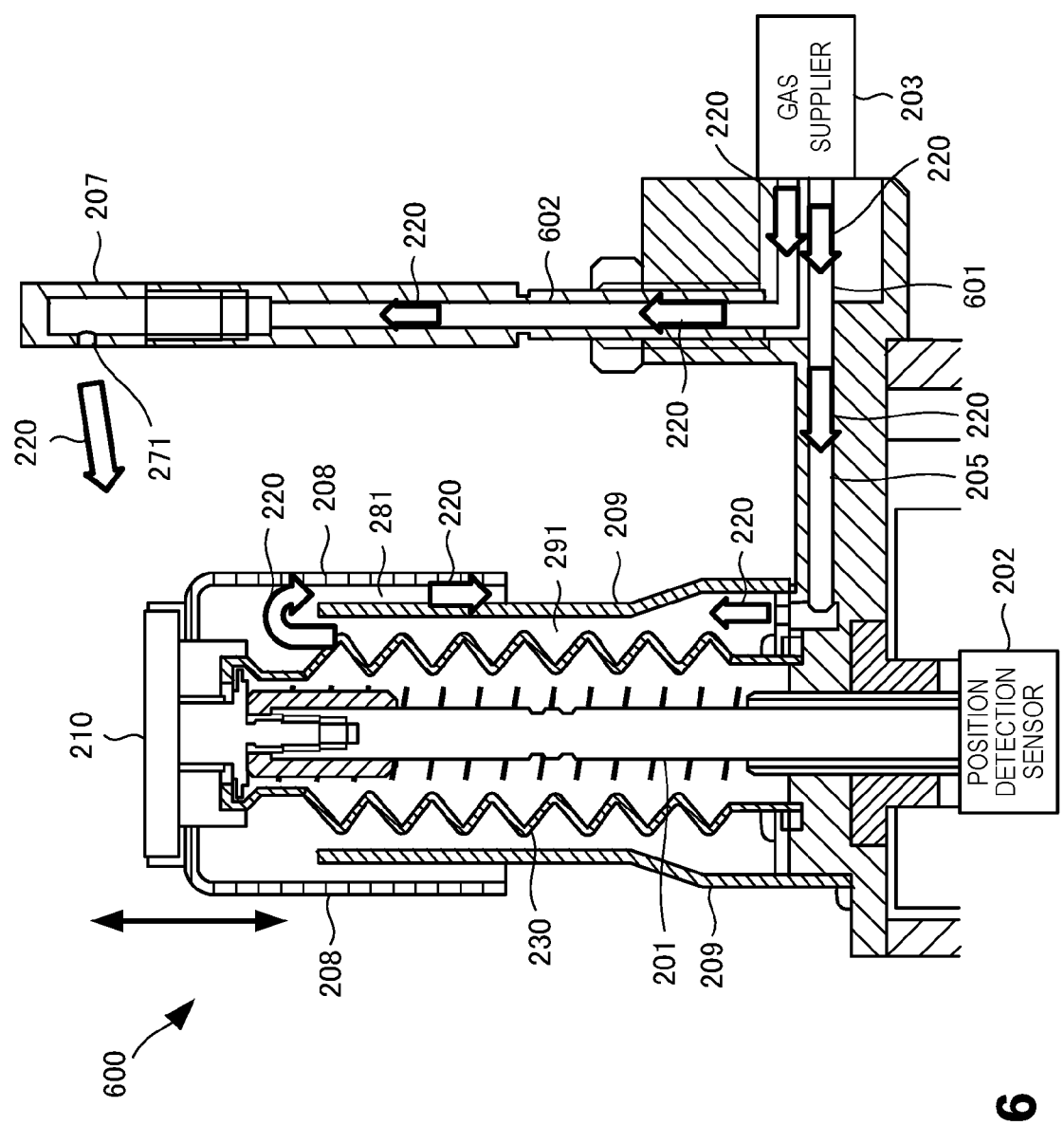
FIG. 6 is a sectional view showing the arrangement of a tool length measurement apparatus according to the fourth embodiment of the present invention.

A tool length measurement apparatus according to the fourth embodiment of the present invention will be described next with reference to FIG. 6. FIG. 6 is a sectional view for explaining the arrangement of the tool length measurement apparatus according to this embodiment. The tool length measurement apparatus according to this embodiment is different from the second embodiment in that two systems of gas supply channels are provided. The rest of the components and operations is the same as in the second embodiment. Hence, the same reference numerals denote the same components and operations, and a detailed description thereof will be omitted.

A tool length measurement apparatus 600 includes a supply channel 601 and a supply channel 602. The supply channel 601 is a supply channel configured to supply air 220 supplied from a gas supplier 203 to the side of a measurement surface 210. The supply channel 602 is a supply channel configured to supply the air 220 supplied from the gas supplier 203 to the side of a blower 207.

Hence, in this embodiment, the channel of the air 220 includes two systems, that is, a channel to push up the measurement surface 210 and a channel to blow the air to the measurement surface 210.

According to this embodiment, since two systems of supply channels are provided, the pressure and the supply amount and timing of the air 220 can be controlled more finely in accordance with the application purpose of the air 220. In addition, the air 220 can be supplied to one supply channel 601 (602) or supplied simultaneously to both the supply channels 601 and 602. Furthermore, the supply timing of the air 220 to be supplied to the supply channel 601 or 602 can be changed to do various kinds of control of the tool length measurement apparatus 600.

Fifth Embodiment

Figure 7:
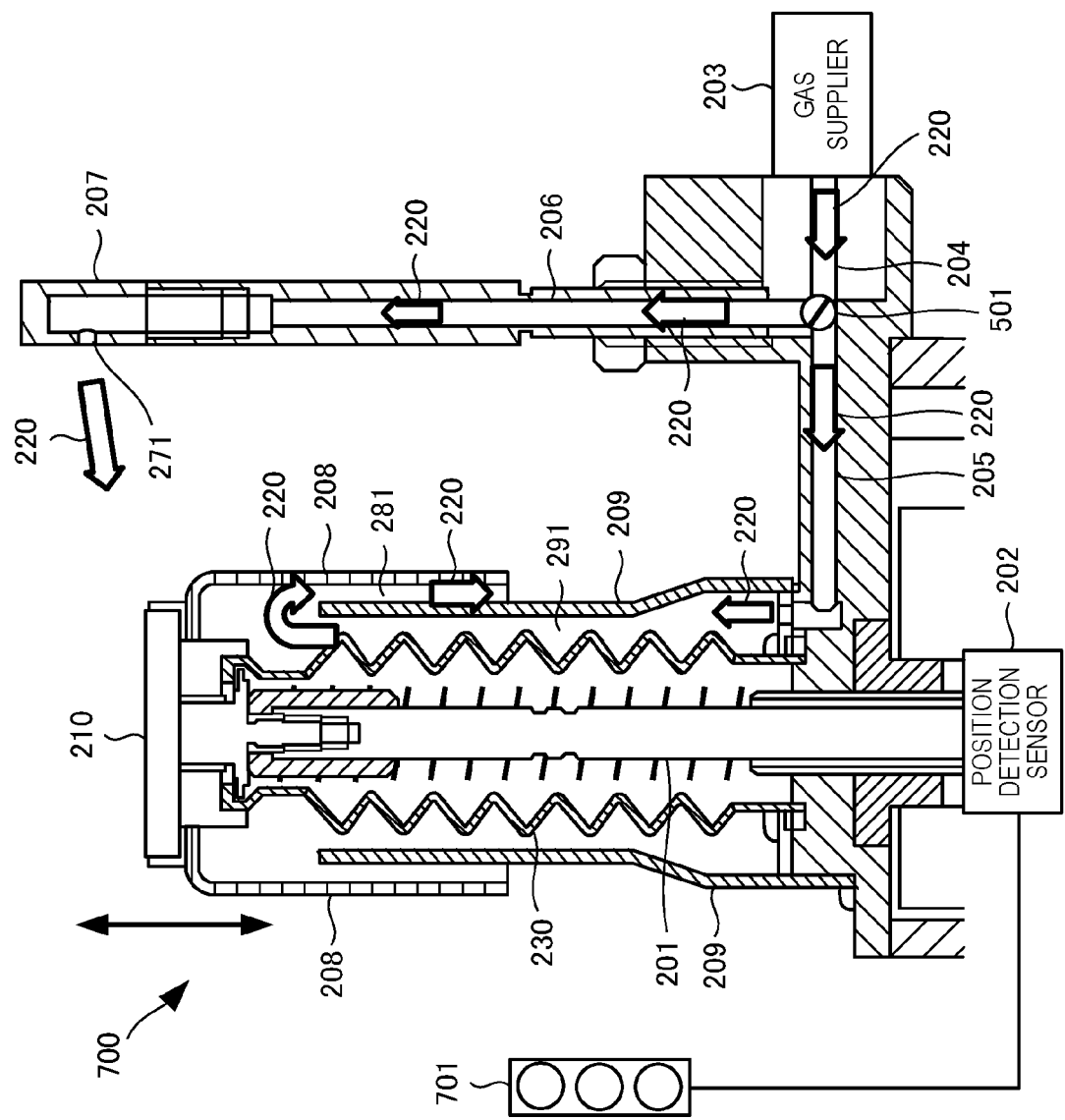
FIG. 7 is a sectional view showing the arrangement of a tool length measurement apparatus according to the fifth embodiment of the present invention.

A tool length measurement apparatus according to the fifth embodiment of the present invention will be described next with reference to FIG. 7. FIG. 7 is a sectional view for explaining the arrangement of the tool length measurement apparatus according to this embodiment. The tool length measurement apparatus according to this embodiment is different from the second embodiment in that a state notification lamp is provided. The rest of the components and operations is the same as in the second embodiment. Hence, the same reference numerals denote the same components and operations, and a detailed description thereof will be omitted.

A tool length measurement apparatus 700 includes a state notification lamp 701. The state notification lamp 701 notifies the user of the position of a measurement surface 210 by lightning or blinking lamps. For example, when the measurement surface 210 is at the reference position, three lamps are lighted. When the measurement surface 210 is at an intermediate position (between the reference position and the overtravel position), two lamps are lighted. When the measurement surface 210 has passed the overtravel position, one lamp is lighted.

Alternatively, the position or state of the measurement surface 210 or the status of the tool length measurement apparatus 700 may be notified by lamp colors, combination of lighting lamps, combination of blinking lamps, and the like. The user can manually select the timing of blowing air 220 or a supply channel 205 or 206 to supply the air 220 while observing the state notification lamp 701.

According to this embodiment, since a lamp is provided, the operator can manually adjust the supply destination of air. In addition, the operator can know the position of the measurement surface or the status of the tool length measurement apparatus 700.

Sixth Embodiment

Figure 8:
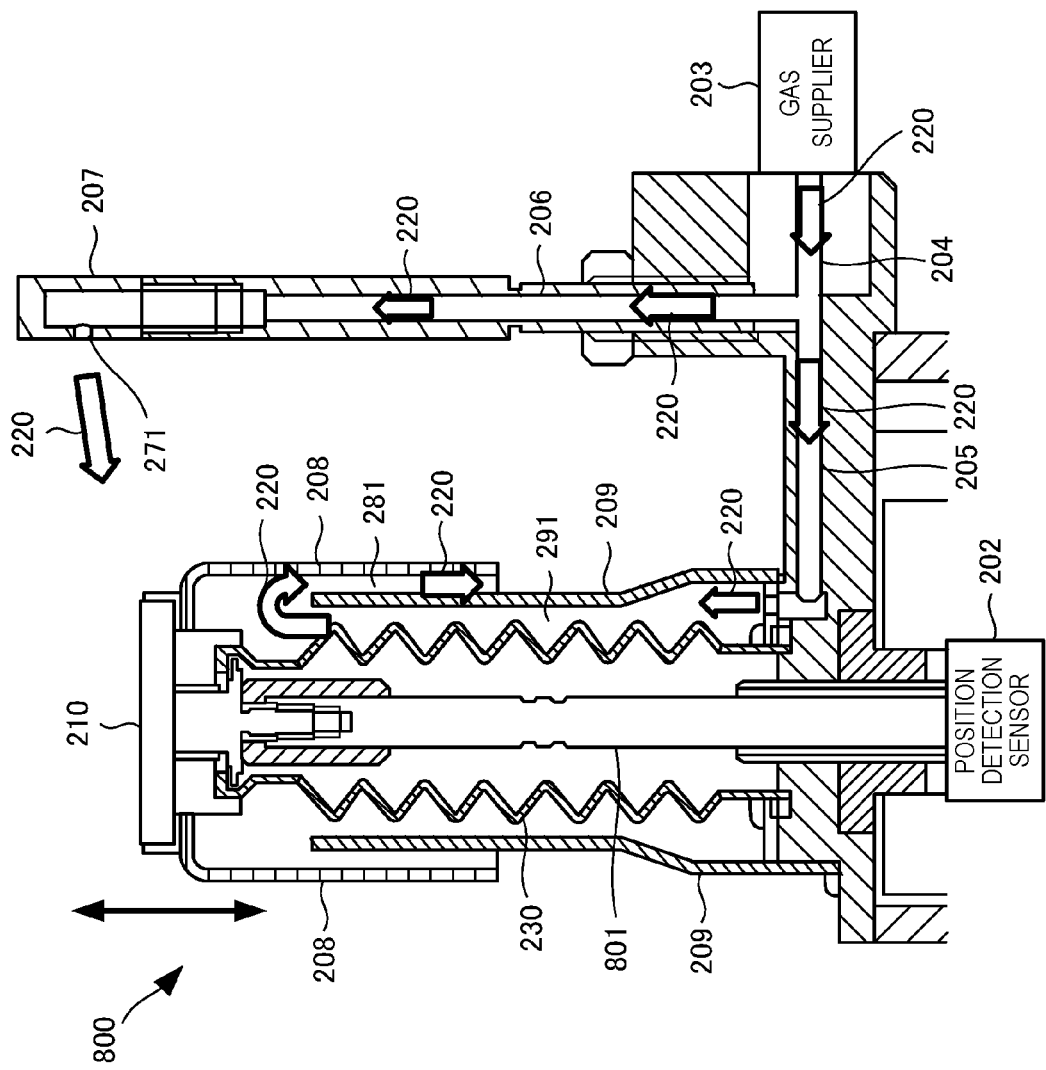
FIG. 8 is a sectional view showing the arrangement of a tool length measurement apparatus according to the sixth embodiment of the present invention.

A tool length measurement apparatus according to the sixth embodiment of the present invention will be described next with reference to FIG. 8. FIG. 8 is a sectional view for explaining the arrangement of the tool length measurement apparatus according to this embodiment. The tool length measurement apparatus according to this embodiment is different from the second embodiment in that a measurement surface is pushed up only by air. The rest of the components and operations is the same as in the second embodiment. Hence, the same reference numerals denote the same components and operations, and a detailed description thereof will be omitted.

A tool length measurement apparatus 800 includes a supporter 801. The supporter 801 is a member that supports a measurement surface 210. When the measurement surface 210 is pushed downward, the supporter 801 also moves downward interlockingly with the motion of the measurement surface 210. However, the supporter 801 does not have an elastic force like a spring. Hence, the measurement surface 210 is not pushed upward by the supporter 801.

Hence, air 220 passing through a supply channel 205 pushes the measurement surface 210 upward.

According to this embodiment, since no spring is used as the supporter, the number of components of the tool length measurement apparatus decreases, and the tool length measurement apparatus can be manufactured easily at a low cost.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-028938 filed on Feb. 17, 2015, which is hereby incorporated by reference herein in its entirety.

What is claimed is:

1. A tool length measurement apparatus comprising:
   a supporter that supports a measurement surface that a tip of a tool contacts while translating in accordance with a biasing force received from the tool;
   a detector that detects a position of the measurement surface in a translation direction; and
   a biasing unit that biases the measurement surface by a gas in a direction against the biasing force received from the tool.

2. The apparatus according to claim 1, further comprising:
   a first supply channel that receives supply of the gas from a gas supply source; and
   a blower that flows the gas to the measurement surface,
   wherein said biasing unit includes a second supply channel that supplies the gas to an inner surface of said supporter,
   said blower includes an outlet of the gas and a third supply channel that supplies the gas to said outlet, and
   said second supply channel and said third supply channel branch from said first supply channel.

3. The apparatus according to claim 1, wherein said supporter further includes a first foreign body entrance prevention cover configured to prevent foreign bodies from entering the tool length measurement apparatus; and
   a second foreign body entrance prevention cover that is configured to, inside said first foreign body entrance prevention cover, partially overlap said first foreign body entrance prevention cover in a noncontact state at a position in the translation direction of the measurement surface and forms a supply channel used to supply the gas to an inner surface of said first foreign body entrance prevention cover, and
   the gas supplied to the inner surface of the first foreign body entrance prevention cover is blown from a gap between said first foreign body entrance prevention cover and said second foreign body entrance prevention cover to an outside of said first foreign body entrance prevention cover.

4. The apparatus according to claim 2, further comprising a controller that controls the gas supply source,
   wherein when said detector detects that the measurement surface is located inside a measurement position in a state in which the tool is not in contact with the measurement surface, said controller supplies the gas from the gas supply source to said first supply channel.

5. The apparatus according to claim 2, further comprising a valve at a position where said second supply channel and said third supply channel branch.

6. The apparatus according to claim 5, further comprising a controller that controls said valve,
   wherein when said detector detects that the measurement surface is located inside a measurement position in a state in which the tool is not in contact with the measurement surface, said controller actuates said valve and supplies air only to said second supply channel.

* * * * *